Patented May 26, 1931

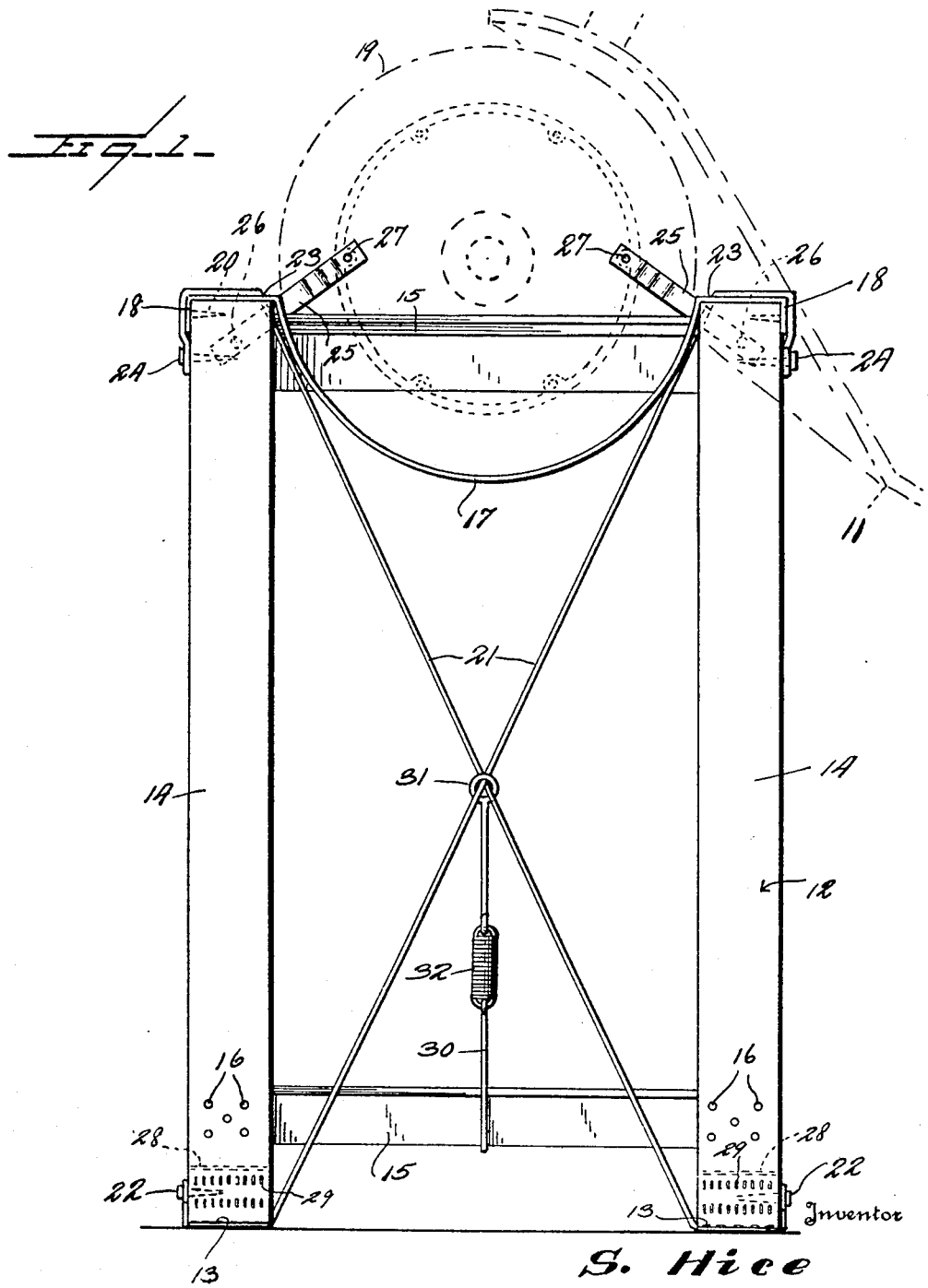

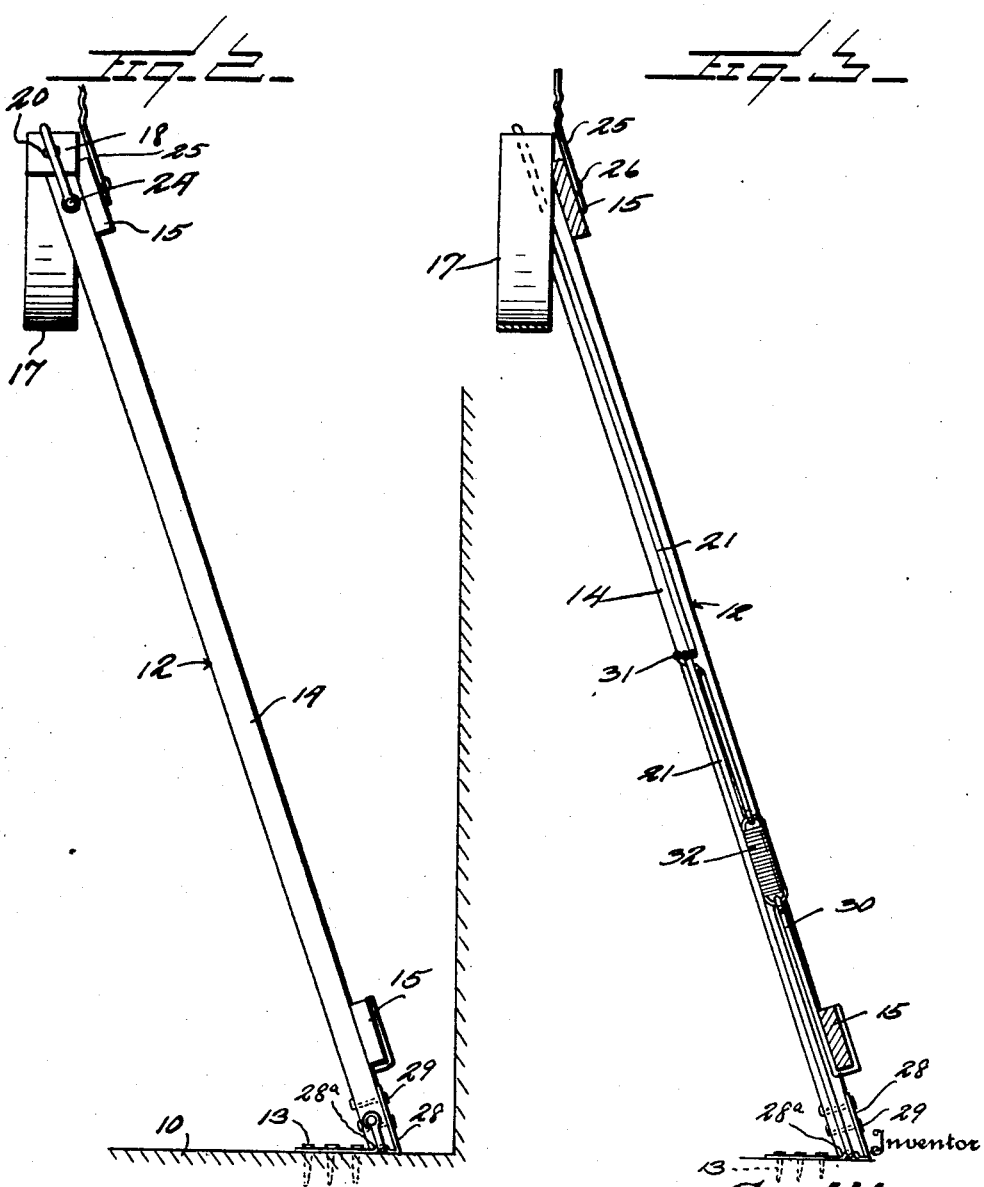

1,807,529

UNITED STATES PATENT OFFICE

SHERMAN HICE, OF DETROIT, MICHIGAN

LOADING DECK FOR AUTOMOBILES

Application filed February 18, 1930. Serial No. 429,379.

The present invention relates to improvements in devices adapted for loading automobiles in freight cars or the like and more particularly to a device adapted to hold one end of the motor vehicle in spaced relation to the floor of the car.

An object of this invention is to provide a deck member which is adapted to support one end of the motor vehicle in a freight car, the device being securely bolted to the floor of the car.

Another object of this invention is to provide suspension means for a motor vehicle so that it will not be necessary to remove the tires or wheels from the motor vehicle when shipping the vehicle in a freight car.

A further object of this invention is to provide a substantially light and at the same time strong frame for supporting one end of the motor vehicle, the frame having means for holding the wheels against movement thereon.

A still further object of this invention is to provide in a device of this character a resilient tensioning means for holding the frame in rigid position on the floor of the car.

The above and various other objects and advantages of this invention will in part be described in and in part be understood from the following detailed description of the present preferred embodiment, the same being illustrated in the accompanying drawings wherein:—

Figure 1 is a detail side elevation of a device constructed according to the preferred embodiment of this invention;

Figure 2 is a detail end elevation of the device; and

Figure 3 is a longitudinal section taken substantially through the center of the device.

Referring to the drawings wherein like numerals of reference designate corresponding parts throughout the several views, the numeral 10 designates the floor of a freight car of conventional construction and which is used for transporting a motor vehicle generally designated as 11.

In the shipment of motor vehicles in a freight car, it has been found desirable to elevate one end of the motor vehicle, the other end being held in position on the floor of the freight car 10 by means of chocks or other securing means.

In devices at present in use it is necessary in order to support the end of the motor vehicle which it is desired to elevate from the floor, to remove the wheels from the motor vehicle, the suspension means engaging the spindles or axles of the motor vehicle.

In devices of this kind it is of course necessary in the shipment of the vehicles to likewise provide crates or the like for the vehicle wheels which are usually shipped with the tires mounted thereon, and in order to eliminate the necessity of removing the wheels from the motor vehicle, I have provided a frame member generally designated as 12 which is adapted to be secured at one end by means of bolts 13 or the like to the floor of the car.

The frame 12 comprises a pair of substantially parallel supporting members 14 which are held in spaced relation to each other by a pair of substantially horizontally disposed parallel bracing members 15, one of the bracing members 15 being positioned adjacent the bottom of the supports 14 and the other bracing member being secured adjacent the upper ends of the supports. The bracing members 15 may be secured to the supports 14 by means of bolts, nails or the like 16.

The frame 12 is preferably positioned on the floor of the freight car 10 in angular relation to the floor, the upper end of the frame being inwardly inclined from the outer walls of the freight car.

An arcuate wheel supporting member or strap 17 depends from the upper end portion of the frame 12, the strap member 17 being adapted to extend across the upper ends of the supports 14 and is preferably bent downwardly along the outer edge portions thereof as at 18 so that when the wheel 19 is positioned in the segmental strap member 17, the upper ends of the supporting beams or members 14 will properly support the strap member 17. The outer ends of the strap 17 may be secured to the supports 14 by means of bolts or screws 20 or the like.

The strap or wheel supporting member 17 is preferably positioned upon the upper end of the supports 14 and inclined therefrom so that when the frame 12 is mounted upon the floor the axis of the strap will be vertically disposed.

A pair of diagonally disposed bracing bars or rods 21 are secured at the lower end portions thereof to the lower end of the supporting members 14, the lower ends of the bracing members 21 preferably extending across the lower ends of the supports 14 and being bent upwardly so as to extend along the outer edge of the supports, and a screw or bolt member 22 is adapted to securely hold the lower end portion of the bracing members 21 against the outer edge of the supports 14.

The braces at the upper end portions thereof are adapted to extend through the strap members 17 as at 23, and the upper ends of the braces are preferably bent in a substantially horizontal plane across the upper ends of the supports 14 and extend downwardly along the outer edge portions of the supports, the ends of the braces being bolted or otherwise secured to the supports by means of bolts 24 or the like.

The frame 12 is also provided with wheel engaging members 25 which are constructed in the form of elongated resilient corrugated bars which are secured at one end to the upper cross-bar 15 and are inclined therefrom in converging relation. The straps or securing members 25 may be bolted or otherwise secured at the lower ends thereof to the supporting members 14 by means of bolts 26 or the like and the securing members 25 have relative swinging movement with respect to the frame 12. The upper ends of the straps 25 are provided with suitable apertures for receiving the lug bolts or rim securing members 27 which are mounted on the wheel 19. The upper ends of the wheel securing members 25 may be arcuately bent or otherwise formed so as to conform to the configuration of the side of the tire so that no undue pressure will be exerted upon the side wall of the tire when the securing members 25 are secured to the wheel.

A bracket member 28 of substantially L-shape construction is adapted to be mounted on the floor of the car, being secured thereto by bolts 13 or the like, and the upstanding leg of the bracket member 28 may be bolted to the supporting members 14 by means of bolts 29 or the like so that the frame 12 will be securely held on the floor of the car against movement.

The bracket member 28 is preferably secured to the outer face of the frame 12 and extends inwardly across the lower end, the horizontal leg of the bracket being arcuately bent as at 28a fitting into a complementary groove in the supports 14, and the braces 21 seat in the grooves 28a so that the strain on the braces will not split the supports 14.

Due to the numerous jars to which a freight car is subjected, it has been found advisable to provide a brace tensioning member 30 which is secured at one end thereof to one of the horizontal brace members 15 and preferably the lower brace 15, and secured at the upper end thereof to the bracing members 21 at the point of intersection of the bracing members, the tensioning member 30 being provided with an eye 31 which is adapted to slidably or loosely engage about the bracing members 21 at the point of intersection.

If desired, a turn buckle or other adjusting member may be interposed in the tensioning member 30 so that the proper tension may be applied to the spring 32 which is positioned intermediate the ends of the brace tensioning member 30.

In the use of this device, the frame 12 is adapted to be secured to the floor of the car and is preferably inclined at the upper end thereof inwardly from the outer wall of the car. The wheel or tire of the motor vehicle may be placed in the arcuate supporting member 17, it of course being understood that the supporting member 17 will be of such configuration as to closely engage about the periphery of the tire. When the wheel has been mounted in the wheel supporting member 17, the wheel securing members 25 may be bolted to the lug bolts of the wheel thereby securely holding the wheel on the frame against circumferential movement. It will of course be understood that the frame members 12 will be provided in pairs which are adapted to be positioned upon the opposite sides of the motor vehicle.

It will of course be understood that various changes and modifications may be made in the details of construction and design of the above specifically described embodiment of the invention without departing from the spirit thereof, such changes and modifications being restricted only by the scope of the following claims:—

What is claimed is:—

1. A loading deck for motor vehicles comprising a frame adapted to be mounted on the floor of a freight car, wheel supporting means carried by the frame, and wheel securing means mounted on the frame and engaging the rim bolts whereby to hold the wheel on said wheel supporting means against circumferential movement.

2. A loading deck for motor vehicles comprising a frame, said frame comprising a pair of parallel supporting members, a pair of transverse spacing members secured to said supporting members, bracing means for said supporting members, wheel supporting means positioned on said supporting members, and wheel securing means mounted on the frame and engaging a wheel positioned on said wheel supporting means.

3. A loading device of the character described comprising a frame, bracing means diagonally disposed within said frame, tensioning means secured to said frame and engaging said bracing means whereby to hold said bracing means under tension, wheel supporting means mounted on said frame, and securing means carried by said frame and adapted to securely hold a wheel on said supporting means.

4. A loading device of the character described comprising a frame, means for securing said frame on a freight car in angular position, a pair of diagonally disposed intersecting bracing members mounted on the frame, resilient means secured to said frame and engaging said bracing means, wheel supporting means mounted on the upper end portion of said frame and adapted to vertically depend therefrom, and wheel securing means carried by the frame.

5. A loading device of the character described comprising a frame, means for securing said frame in angular position to the floor of a freight car, a pair of bracing members diagonally disposed in said frame, said bracing members being secured at the opposite ends thereof to the upper and lower end portions of said frame, means for securing said bracing members to said frame, a resilient tension member carried by the frame and engaging said bracing members, wheel supporting means depending from said frame, means for securing said wheel supporting means to said frame, and a pair of converging wheel securing members mounted on the frame and adapted to firmly hold a wheel upon said wheel supporting means.

6. A loading device of the character described comprising a frame, means for securing said frame in angular position, said securing means being also adapted to prevent splitting of the frame, means carried by the frame for supporting an applied wheel having a tire positioned thereon, said tire coacting with the frame whereby to cushion the suspended vehicle, and yieldable means mounted on the frame and engaging the wheel whereby to hold said tire on said supporting means.

7. A loading deck for motor vehicles comprising a frame, means mounted on the frame for supporting in an elevated position an applied wheel having a tire mounted thereon, said tire coacting with the supporting means for cushioning the vehicle upon the frame, and resilient means carried by the frame and engaging the wheel inwardly of the tire for holding the wheel against circumferential movement.

In testimony whereof I hereunto affix my signature.

SHERMAN HICE.